June 16, 1942.　　A. J. TAYLOR　　2,286,695
MACHINE FOR ASSEMBLING AND/OR DISASSEMBLING THE PARTS
OF SPRING TENSIONED DEVICES
Filed Nov. 20, 1940　　2 Sheets-Sheet 2
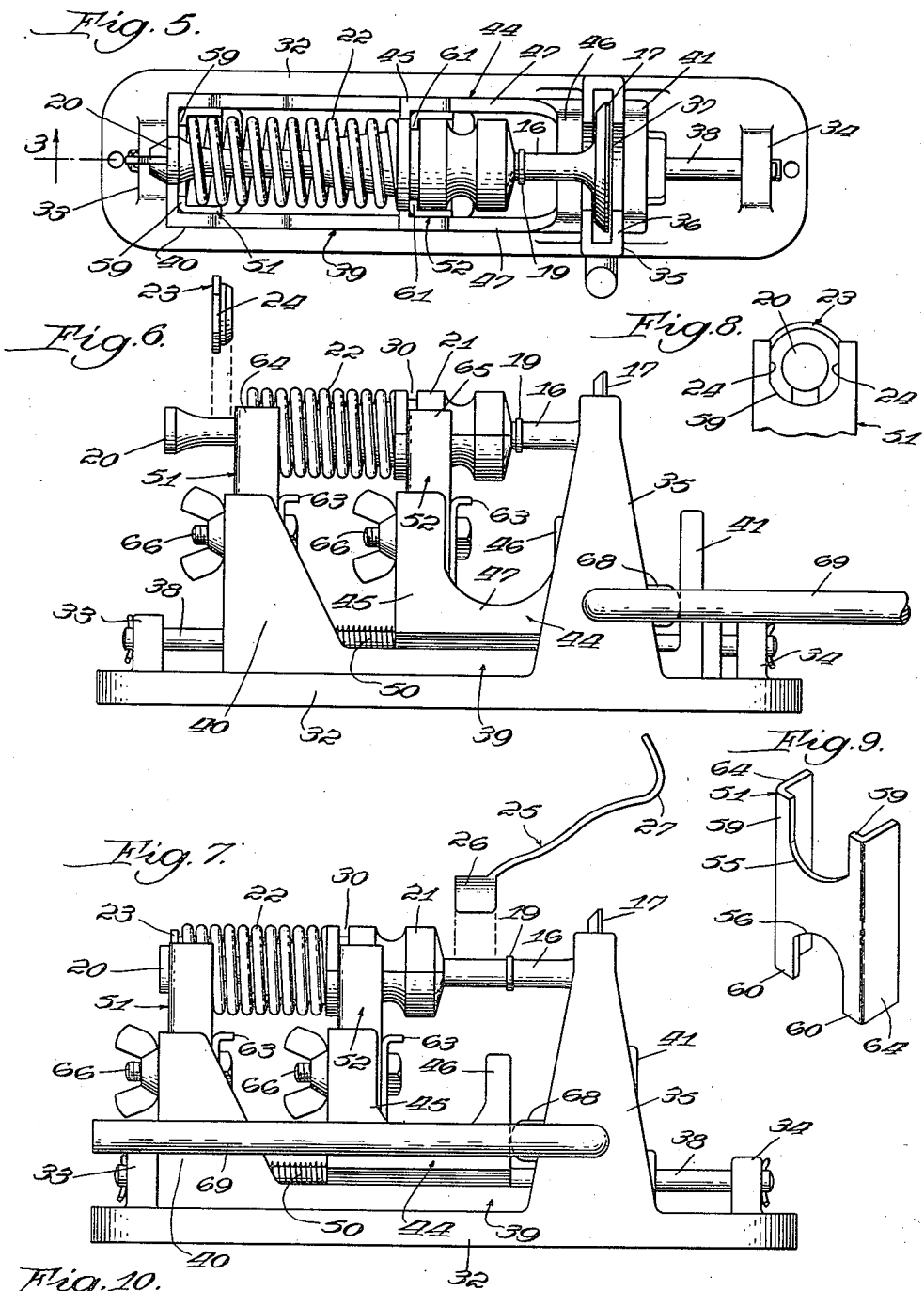

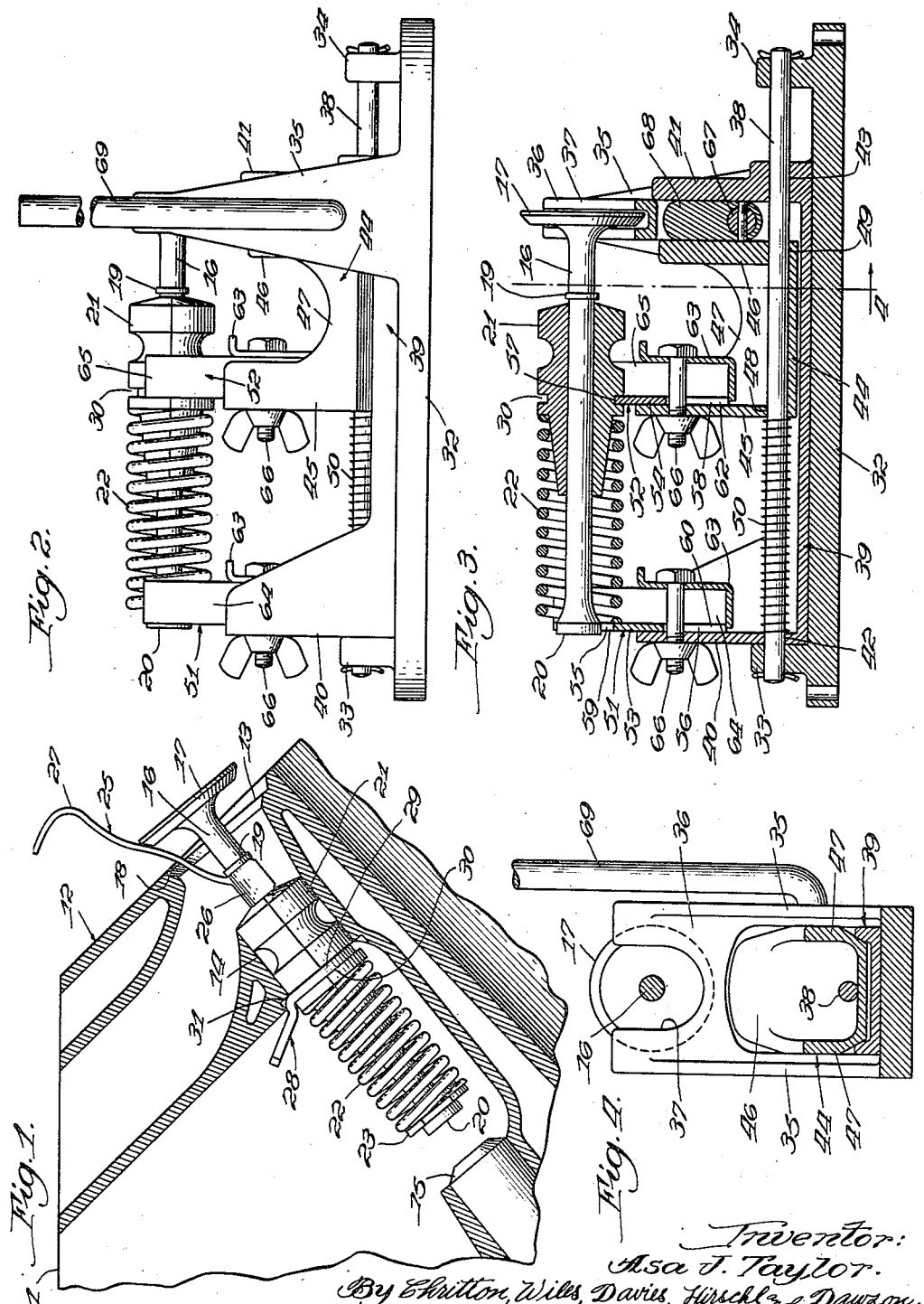

Patented June 16, 1942

2,286,695

UNITED STATES PATENT OFFICE 2,286,695

MACHINE FOR ASSEMBLING AND/OR DISASSEMBLING THE PARTS OF SPRING TENSIONED DEVICES

Asa J. Taylor, River Forest, Ill.

Application November 20, 1940, Serial No. 366,457

4 Claims. (Cl. 29—86.3)

My invention relates to machines for assembling into tensioned condition the parts of spring tensioned assemblies and more particularly, though not exclusively, the parts of spring tensioned valve assemblies for internal combustion engines wherein the valves, in the normal operative condition of the engine, are yieldingly urged into seated position by the springs of the valve assemblies, and in order that the assemblies may be installed in position in the engine, with the maximum of ease and rapidity and without danger of injury to the workmen or the engine, requires that the parts of the assemblies be abnormally relatively positioned and under excess spring tension and so held by removable abutments or retainers applied to the valve-stems of the valve assemblies which, after installation of the valve assemblies in the engine, may be readily removed to relieve the excess tension and permit the parts of the valve assemblies to assume the relative positions desired for the normal functioning of the valves.

It also relates to a machine by which the parts of such an assembly may be disassembled upon removal from the engine with the spring placed under excess spring tension and the removable abutment or stop replaced to hold the spring in this condition.

My objects are to provide a novel, simple and inexpensive construction of machine for assembling and/or disassembling the parts of spring tensioned structures and more particularly valve assemblies as above referred to, with the parts thereof abnormally relatively positioned and under excess tension to be relieved upon securing the valve assemblies in position in the engine or in disassembling the parts of the assembly; to provide a machine by which the assembling or disassembling operation may be quickly and easily performed; and other objects as will be manifest from the following description.

As a preface to the following description of the drawings it may be stated that I have chosen to illustrate my invention as embodied in a construction suitable for assembling and/or disassembling the parts of valve assemblies of a well known type and currently used in the engines of Ford automobiles, wherein the bushing in which the valve stem slides carries a removable and replaceable stirrup bracket mounted in a peripheral groove in the bushing and extending laterally beyond the outer surface of the bushing for abutting the inner surface of the engine block, and a coil spring, interposed between the bushing and a spring retainer on the end of the stem opposite that equipped with the valve, serves to yieldingly force the valve against the seat in the engine port with which it is to cooperate and force the valve stem into the path of the cooperating plunger actuated by the valve-operating cam shaft of the engine.

To permit the valve assembly to be easily installed in place in the engine and be easily removed therefrom, it is desirable that, prior to inserting the valve assembly into the engine block and prior to its removal therefrom, the bushing be shifted on the stem, out of normal position away from the valve and against the resistance of the spring, so that the distance from the stirrup-bracket-receiving groove in the bushing to the inner extremity of the valve stem is less than the distance from the inner surface of the engine block at the valve-assembly-receiving opening to the cam-actuated plunger, thereby causing the spring of the assembly to be compressed in excess of the tension required in the normal operating condition of the assembly; and to hold the stem, and bushing thus abnormally positioned and the spring thus abnormally conditioned, until the valve assembly has been inserted into the engine block and the stirrup bracket applied to the bushing, as by means of a removable abutment or retainer such as that above mentioned applied to the valve stem of the valve assembly, and, when the valve assembly is to be removed from the engine, to again establish the abnormal positioning of the stem and bushing and the abnormal conditioning of the spring as above referred to, prior to the disconnecting of said stirrup bracket from the bushing and maintain such abnormal positioning and conditioning of the parts of the valve assembly in the removal of the valve assembly from the engine by again applying said removable abutment or retainer to position on the stem in the valve assembly.

Referring to the accompanying drawings:

Figure 1 is a fragmentary sectional view of the engine block of a current Ford internal combustion engine, the section being taken through one of the ports and showing positioned therein a valve assembly above described, as conditioned by a machine embodying my invention and in which the stem and bushing are abnormally positioned and the spring for the valve is placed under excess compression and retained in such condition by a removable abutment or retainer.

Figure 2 is a view in side elevation of the machine showing the parts thereof in normal condition, namely, the condition in which the parts of the valve assembly are applied thereto.

Figure 3 is a view in longitudinal elevation of the machine, the section being taken at the line 3 on Fig. 5 and viewed in the direction of the arrow.

Figure 4 is a transverse sectional view of the machine, the section being taken at the line 4 on Fig. 3 and viewed in the direction of the arrow.

Figure 5 is a plan view of the machine in normal condition.

Figure 6 is a view of the machine in side elevation showing the positions assumed by the parts thereof when the machine is operated to compress the spring of the valve assembly from one end, a spring retainer to be assembled with the stem of the valve assembly being shown in related position to the other parts of the assembly but separated therefrom.

Figure 7 is a similar view showing the positions assumed by the parts of the machine when the machine is operated to compress the spring of the valve assembly from the other end, a removable abutment or retaining device for holding the parts in the position to which they are operated being shown in related position to the other parts of the assembly, but separated therefrom.

Figure 8 is a fragmentary end view of the structure shown in Fig. 7, viewing it from the left in this figure.

Figure 9 is a perspective view of one of the similar cradles forming parts of the machine; and Figure 10, an end view of the removable abutment or retainer referred to in the above description of Fig. 7.

In order that a better understanding of the use of the particular machine shown may be had, the description thereof is prefaced, as follows, by a description of the illustrated valve assembly and the procedure for installing it in an engine block as shown in Fig. 1.

In this figure the engine block, from which the cover has been removed to expose the opening 11 into the interior of the block, is represented at 12 and one of its ports at 13 which is in line with a bushing-receiving opening 14 in the block in line with the plunger 15 by which the valve for this port is to be operated by the cam shaft of the engine.

The valve assembly which is to be installed at the port 13 comprises a valve stem 16 having a valve head 17 which closes downwardly against a seat 18 surrounding the port 13, the stem 16 having a flange 19 adjacent the head 17 and an expanded portion 20 at its opposite end; a bushing 21 shown as formed of two similar halves, surrounding, and slidable on, the stem 16 below the flange 19; a coil spring 22, under compression, between the bushing 21 and the expanded end 20 of the stem; and a spring retainer 23 of general yoke form straddling the stem 16 at its lower end and interposed between the expanded end 20 of the stem and the spring 22, the spring retainer 23 having diametrically opposed vertical straight edges 24.

As the final act in the assembling of the parts of the valve assembly, the bushing 21 is forced away from the flange 19 substantially to the position shown in Fig. 1 and in this position a removable abutment or retainer device 25 is applied, at a yoke portion 26 thereof, to straddling position on the stem 16 between the flange 19 and the bushing 21, the device 26 being held in place on the valve assembly by the spring 22 which operates to clamp the device 25 between the flange 19 and the bushing 21; the device 25 being formed with a handle portion 27 which, in the installed position of the valve assembly in the engine, extends outwardly through the port 13 beyond which it is accessible for removal, upon applying force to the valve stem, as for example at its lower end, as by means of any suitable hand tool, such as a lever bar, to relieve the clamping action against the device 25 thereby permitting of its ready separation from the valve assembly, the valve head 17, upon the removal of the device 25 through the port 13 and discontinuing the manual pressure exerted against the stem 16 as stated, becoming automatically seated in the port 13, thereby assuming the proper operating position.

The valve assembly is held in place in the engine block by a removable and replaceable stirrup bracket 28 mounted at its stirrup portion 29 in an endless groove 30 in the periphery of the bushing 21 and extending laterally beyond this bushing, the bracket 28 seating at its stirrup portion 29 in a counterbore 31 in the inner surface of the engine block and surrounding the opening 14, under the pressure of the spring 22, the valve stem 16 being held against the plunger 15 by this spring.

The abnormal positioning of the parts of the valve assembly as shown in Fig. 1 permits of the inserting of the valve assembly into the engine block to a position in which the groove 30 in the bushing 21 extends inwardly beyond the inner surface of the engine block and thus permits of the ready application of the stirrup bracket 28 to the bushing, without interference from any spring tensioned part; in other words, the distance from the lower end of the stem 16 to the groove 30 is not greater than the distance from the plunger 15 to the inner surface of the engine block at the opening 14 and thus no further compressing of the spring 22 is necessary to apply the stirrup bracket 28 to the bushing 21.

The particular machine shown comprises a base member 32 having upwardly extending end lugs 33 and 34, a pair of side uprights 35 between the ends of the base member and connected together by a cross member 36 extending crosswise of the base member and having an upwardly opening pocket 37; and a rod 38 extending lengthwise of the base portion 32 and mounted in the lugs 33 and 34.

Movable lengthwise on the base member 32 is a slide 39 having uprights 40 and 41 at its opposite ends, the upright 40 being of channel form. The rod 38 extends through openings 42 and 43 in the uprights 40 and 41 and serves to guide the slide 39 in its movements.

Located above the slide 39 is a second slide 44 extending lengthwise of the slide 39 and having uprights 45 and 46 at its opposite ends, the uprights 45 and 46 being connected together by side platelike portions 47 and located between the uprights 40 and 41. The rod 38 extends through openings 48 and 49 in the uprights 45 and 46, respectively, and serves as a means for guiding the slide 44 in its movements.

A coil spring 50 encircles the rod 38 between the uprights 40 and 45 and yieldingly urges the slides 39 and 44 in opposite directions.

The uprights 40 and 45 are provided with saddle portions to coact with certain of the parts which are to form the valve assembly. Inasmuch as valve assemblies of this type are made in two different sizes these saddles are provided as parts of like shape and size and separate from the uprights 40 and 45, being adapted in one position of the saddles, namely, the position shown in the drawings, to be used in the assembling of the parts of the larger size of valve assembly and when manipulated into another position to be used in the assembling of the parts of the smaller size valve assembly.

The saddle forming portions referred to are represented at 51 and 52, being shown as in the form of channels the upper and lower ends of the webs 53 and 54 of which are recessed as represented at 55, 56, 57 and 58, to form saddle portions of different sizes, presenting vertical inwardly extending abutment-forming flanges 59, 60, 61 and 62, the recesses 55 and 57 for the larger size of valve assembly being wider than those for the small size valve assembly. The saddle forming portions, for use in assembling the parts of the larger size of valve assemblies, are positioned with their wider recesses 55 and 57 uppermost and bear at their webs 53 and 54 against the uprights 40 and 45, respectively, to which they are clamped as by means of angle clamp plates 63 held against the flanges 64 and 65 of the saddle forming portions 51 and 52, respectively, by means of clamp screws 66; and for the smaller size of valve assemblies being positioned in inverted position with their narrower saddle forming recesses 56 and 58 uppermost and bearing at their flanges 64 and 65 against the uprights 40 and 45, respectively.

The machine shown comprises means for first actuating the slide 39 to the right in Figs. 2, 3, 4, 6 and 7, while the slide 44 is held against movement and thereafter actuating the slide 44 to the left in these figures of the drawings, while holding the slide 39 against movement, these means being shown as comprising a shaft 67 journaled in the uprights 35 to extend crosswise of the machine and carrying a block 68 extending laterally of the shaft and forming a cam, interposed between the uprights 41 and 46 of the slides 39 and 44, the shaft 67 having an operating handle 69 rigid therewith at one end; it being noted that the spring 50 serves to yieldingly hold the uprights 41 and 46 against the cam device 68.

To assemble the parts of the particular valve assembly shown, the valve stem 26, with the bushing 21 and coil spring 22 positioned thereon as shown in Figs. 2, 3 and 5, is applied downwardly to the machine to position the valve head 17 in the pocket 37, and position the abutment-forming portions 61 in the groove 57 of the bushing 21, the outer end of the coil spring 22 in this position of the parts, extending within the saddle-forming portion 51 and adjacent the abutment forming flanges 59 thereof which lap this end of the spring.

The first operation is to compress the spring 22 to permit the spring retainer 23 to be applied to the stem 16 of the valve to serve as an abutment for the spring 22 in compressed condition. This is effected by swinging the handle 69 to the right in Fig. 2 which causes the cam 68 to move against the upright 41 of the slide 39, thereby shifting the slide 39 to the right to the position shown in Fig. 6, the slide 44, and therefore the bushing 21, being held against movement by the engagement of the upright 46 with the cam block 68, the valve stem 16 being held against accidental shifting by the interlock between the valve head 17 and the walls of the pocket 37. By swinging the handle 69 to the horizontal position shown in Fig. 8 the several parts are releasably locked in the positions to which they are operated as stated.

The operator then drops the spring retainer over the valve stem 16 between its expanded portion 20 and the saddle portion 51, sliding it along the stem to the right in which it becomes entered, at its straight edges 24, between the vertical abutment forming flanges 59.

The operator then reversely actuates the handle 69, swinging it from the position shown in Fig. 6 to the position shown in Fig. 7. In this movement of the handle the cam 68 swings from the position shown in Fig. 6 to the position shown in Fig. 7 and in so moving forces the slide 44, and with it the bushing 21, to the left to compress the spring 22 as shown in Fig. 7, the slide 39 being held against movement with the slide 44 by the engagement of the upright 41 with the cam block and the valve stem 16 being held against accidental shifting by the engagement of its valve head 17 with the walls of the pocket 37, the bushing 21 in thus compressing the spring becoming relatively widely spaced from the flange 19 on the stem 16.

The operator then applies the retainer device 25 to the valve stem 16 between the bushing 21 and the flange 19, the device 25 becoming clamped between the bushing 21 and flange 19, in the expanding of the spring 22 to the position shown in Fig. 1 by the operator swinging the handle 69 from the horizontal position shown in Fig. 7 to the normal, upright position shown in Fig. 2.

The valve assembly may then be readily lifted out of the machine, with the retaining device 25 positioned thereon as stated and the assembly installed in place in an engine block as above described.

When it is desired to disassemble the parts of the valve assembly, removed from the engine block with an abutment or retainer device 25 in position on the valve assembly, the operator applies the valve assembly to the machine to position the abutment-forming portions of the saddle-forming portion 52 in the groove 31 in the bushing 21, the end of the spring at the retainer 23 into lapping relation to the abutment-forming portions of the saddle-forming portion 51, and the valve head 17 in the pocket 27. The operator then swings the operating handle 69 to the left which relieves the clamping action against the device 25 and permits it to be removed, and then swings it to the right to further compress the spring 22 which frees the retainer 23 for removal from its position on the stem 16, whereupon the remaining parts of the valve assembly may be readily disassembled.

While I have illustrated and described a particular construction of machine embodying my invention I do not wish to be understood as intending to limit it thereto, as the machine shown may be variously modified and altered and the invention embodied in other forms of structure without departing from the spirit of the invention. Furthermore, while the invention has been illustrated and described as utilized for the assembling of the parts of a certain construction of valve assembly, I do not wish to be understood as intending to limit the invention thereto as it may be utilized for the assembling of the parts of other spring tensioned assemblies and valve assemblies other than the particular illustrated construction of valve assembly.

What I claim as new, and desire to secure by Letters Patent, is:

1. A machine for the purpose set forth comprising a base having a portion for engagement with the valve on the valve stem of a valve assembly, for holding said stem and valve against lengthwise movement, a plurality of slides independently movable along said base, said slides having abutments for a bushing slidable on said stem and for one end of a spring on said stem and bearing against said bushing, respectively, and means operative to actuate said slides in succession to compress said spring first from one end thereof and then from the other end thereof.

2. A machine for the purpose set forth comprising a base, a plurality of slides independently movable along said base, abutment-forming members separate from said slides and carried thereby for a bushing slidable on a rod and for one end of a spring on said rod and bearing against said bushing, respectively, said abutment-forming members being adapted at one end for cooperation with assemblies of one size and at their opposite end for association with assemblies of a different size and reversible on said slides to accommodate said different sizes of assemblies, means for securing said members to said slides in either position of said members, and means operative to actuate said slides in succession to compress said spring, first from one end thereof and then from the other end thereof.

3. A machine for the purpose set forth comprising a base, a plurality of slides independently movable along said base, abutment-forming members of channel shape recessed at their opposite ends and separate from said slides and carried thereby, for a bushing slidable on a rod and for one end of a spring on said rod and bearing against said bushing, respectively, said abutment-forming members being adapted at one end for cooperation with assemblies of one size and at their opposite end for association with assemblies of a different size and reversible on said slides to accommodate said different sizes of assemblies, means for securing said members to said slides in either position of said members, and means operative to actuate said slides in succession to compress said spring, first from one end thereof and then from the other end thereof.

4. A machine for the purpose set forth comprising a base, a plurality of slides independently movable along said base; said slides being disposed one within the other and having projections extending therefrom in the same direction and crosswise of said slides, and cam means between the projections at one end of said slides for actuating said slides in opposite directions, in succession, the others of said projections forming abutments for a member slidable on a rod and for one end of a spring on said rod and bearing against said member, respectively.

ASA J. TAYLOR.